(12) United States Patent
Chen et al.

(10) Patent No.: US 10,212,709 B2
(45) Date of Patent: Feb. 19, 2019

(54) RADIO BASE STATION, MOBILE STATION AND METHOD FOR DETERMINING TRANSMITTING POWER

(71) Applicant: NTT DoCoMo, Inc., Tokyo (JP)

(72) Inventors: Xiaohang Chen, Beijing (CN); Anxin Li, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 248 days.

(21) Appl. No.: 15/056,006

(22) Filed: Feb. 29, 2016

(65) Prior Publication Data

US 2016/0262158 A1 Sep. 8, 2016

(30) Foreign Application Priority Data

Mar. 4, 2015 (CN) .......................... 2015 1 0096634

(51) Int. Cl.
*H04W 52/04* (2009.01)
*H04W 72/04* (2009.01)
*H04W 52/52* (2009.01)
*H04W 52/34* (2009.01)

(52) U.S. Cl.
CPC ....... *H04W 72/0473* (2013.01); *H04W 52/34* (2013.01); *H04W 52/52* (2013.01)

(58) Field of Classification Search
CPC ................. H04W 52/00; H04W 52/04–52/267
See application file for complete search history.

(56) References Cited

U.S. PATENT DOCUMENTS

2002/0058483 A1* 5/2002 Shinichi ................. H01Q 1/243
455/575.7
2002/0098860 A1 7/2002 Pecen et al.
(Continued)

OTHER PUBLICATIONS

Saito Yuya et al: "Non-Orthogonal Multiple Access (NOMA) for Cellular Future Radio Access", 2013 IEEE 77th Vehicular Technology Conference (VTC Spring), IEEE, Jun. 2, 2013 (Jun. 2, 2013), pp. 1-5, XP032547855, ISSN: 1550-2252, DOI: 10.1109/VTCSPRING. 2013.6692652 [retrieved on Dec. 22, 2013].
(Continued)

*Primary Examiner* — Andrew W Chriss
*Assistant Examiner* — Kenan Cehic
(74) *Attorney, Agent, or Firm* — Harness, Dickey & Pierce, P.L.C.

(57) ABSTRACT

Embodiments of the present disclosure provide a radio base station, a mobile station and a method for determining a transmitting power. A radio base station, according to an embodiment of the present disclosure, is connected with a plurality of mobile stations, wherein a first mobile station in the plurality of mobile stations can form at least one mobile station pair with other mobile stations. The radio base station comprises: a processing unit, configured to determine an initial value of a power factor of each mobile station pair according to state data of respective mobile stations in the mobile station pair, and determine an adjustment value of the power factor for the first mobile station according to state data of the first mobile station; and a transmitting unit, configured to transmit the initial value of the at least one mobile station pair and the adjustment value to the first mobile station.

11 Claims, 4 Drawing Sheets

(56) References Cited

U.S. PATENT DOCUMENTS

| | | | | |
|---|---|---|---|---|
| 2005/0111391 A1* | 5/2005 | Oki | ............ | H04W 52/281 |
| | | | | 370/311 |
| 2006/0063483 A1* | 3/2006 | Suematsu | ............ | H04H 40/18 |
| | | | | 455/3.02 |
| 2006/0120445 A1* | 6/2006 | Okamura | ............ | H04L 5/0046 |
| | | | | 375/227 |
| 2011/0207415 A1* | 8/2011 | Luo | ............ | H04B 7/0413 |
| | | | | 455/68 |
| 2013/0040578 A1* | 2/2013 | Khoshnevis | ............ | H04W 52/242 |
| | | | | 455/67.11 |
| 2014/0314006 A1 | 10/2014 | Suh et al. | | |

OTHER PUBLICATIONS

"Justification for NOMA in New Study on Enhanced Multi-User Transmission and Network Assisted Interference Cancellation for LTE NTT DoCoMo, Inc", 3GPP Draft; RP-141936 Justification for NOMA, 3rd Generation Partnership Project (3GPP), Mobile Competence Centre; 650, Route Des Lucioles; F-06921 Sophia-Antipolis Cedex; France, vol. TSG RAN, No. Maui, USA; Dec. 8, 2014-Dec. 11, 2014 (Dec. 2, 2014), XP050898641, Retrieved from the Internet: URL:http://www.3gpp.org/ftp/Meetings_3GPP_SYNC/RAN/Docs/ [retrieved on Dec. 2, 2014].

Extended European Search Report for corresponding European Patent Application No. 16152405.3, EPO/Munich, dated Jul. 15, 2016.

\* cited by examiner

RADIO BASE STATION, MOBILE STATION AND METHOD FOR DETERMINING TRANSMITTING POWER

BACKGROUND

Embodiments of the present disclosure relate to a radio base station, a mobile station and a method for determining a transmitting power. More specifically, the present disclosure relates to a radio base station for determining a transmitting power of a mobile station, a mobile station and a corresponding method.

In a Multiple-Input Multiple-Output (MIMO) communication system, Equal Power Allocation (EPA) is usually adopted to make a plurality of mobile stations in different spatial beams transmit signals at a same transmitting power. For example, in a system implemented by using a Non-Orthogonal Multiple-Access (NOMA) technology and a Multi-User Multiple-Input Multiple-Output (MU-MIMO) technology, a plurality of mobile stations connected with a same radio base station can form mobile station pairs, and mobile stations in each mobile station pair share same time and frequency resources. According to the NOMA technology, a communication system may include two functional levels. When the mobile stations in the mobile station pair are located at different functional levels, data transmissions of two mobile stations in the mobile station pair may be distinguished by transmitting powers. In another aspect, when the mobile stations in the mobile station pair are located at a same functional level, the two mobile stations may be located in different spatial beams according to the MIMO technology; in this case, signal transmissions of the two mobile stations in the mobile station pair are distinguished by the different spatial beams, and transmitting powers are allocated equally to the two mobile stations. However, since channel states of the mobile stations are different, the same transmitting power may cause deterioration to communication states of the mobile stations.

In order to improve allocation of the transmitting power, it has been proposed that an optimum transmitting power allocated to each mobile station is determined in a manner of exhaustive search, so that a throughput is maximized when the mobile station transmits signals at the optimum transmitting power. However, a calculation that the optimum transmitting power allocated to each mobile station is determined in a manner of exhaustive search is relatively complex, and a signaling overhead required to transmit the searched optimum transmitting power to the mobile station is high.

SUMMARY

In view of the above problems, it is desirable to provide a method for determining a transmitting power which has low complexity and can optimize a communication state of a mobile station, a radio base station and a mobile station.

According to an embodiment of the present disclosure, there is provided a radio base station, connected with a plurality of mobile stations, wherein a first mobile station in the plurality of mobile stations can form at least one mobile station pair with other mobile station in the plurality of mobile stations. The radio base station comprises: a processing unit, configured to determine an initial value of a power factor of each mobile station pair according to state data of respective mobile stations in the mobile station pair, and determine an adjustment value of the power factor for the first mobile station according to state data of the first mobile station; and a transmitting unit, configured to transmit the initial value of the at least one mobile station pair and the adjustment value to the first mobile station, so as to make the first mobile station determine a transmitting power allocated to the first mobile station according to the initial value and the adjustment value.

According to another embodiment of the present disclosure, there is provided a mobile station, wherein a plurality of mobile stations including the mobile station are connected with a radio base station, and the mobile station can form at least one mobile station pair with other mobile station in the plurality of mobile stations. The mobile station comprises: a receiving unit, configured to receive an initial value of a power factor of the at least one mobile station pair and an adjustment value of the power factor for the mobile station; and a processing unit, configured to determine an initial value of a power factor of a specific mobile station pair where the mobile station is located currently according to the received initial value, determine a power factor of the mobile station according to the initial value of the power factor of the specific mobile station pair and the adjustment value, and determine a transmitting power allocated to the mobile station according to the power factor.

According to another embodiment of the present disclosure, there is provided a method for determining a transmitting power, applied to a radio base station, wherein the radio base station is connected with a plurality of mobile stations, and a first mobile station in the plurality of mobile stations can form at least one mobile station pair with other mobile station in the plurality of mobile stations. The method comprises: determining an initial value of a power factor of each mobile station pair according to state data of respective mobile stations in the mobile station pair; determining an adjustment value of the power factor for the first mobile station according to state data of the first mobile station; and transmitting the initial value of the at least one mobile station pair and the adjustment value to the first mobile station, so as to make the first mobile station determine a transmitting power allocated to the first mobile station according to the initial value and the adjustment value.

According to another embodiment of the present disclosure, there is provided a method for determining a transmitting power, applied to a mobile station, wherein a plurality of mobile stations including the mobile station are connected with a radio base station, and the mobile station can form at least one mobile station pair with other mobile stations in the plurality of mobile stations. The method comprises: receiving an initial value of a power factor of the at least one mobile station pair and an adjustment value of the power factor for the mobile station; determining an initial value of a power factor of a specific mobile station where the mobile station is located currently according to the received initial value; determining a power factor of the mobile station according to the initial value of the power factor of the specific mobile station and the adjustment value; and determining a transmitting power allocated to the mobile station according to the power factor.

In the solutions according to the embodiments of the present disclosure, a form of a power factor is predetermined, an initial value of a power factor in each mobile station pair is determined according to state data of respective mobile stations in the mobile station pair, and an adjustment value of the power factor for the first mobile station is determined according to state data of the first mobile station. Therefore, the radio base station may accurately determine a transmitting power to be allocated to the mobile station and used in the mobile station according to the initial value of the power factor in the mobile station pair where the mobile station is located and the adjustment value of the mobile station.

DETAILED DESCRIPTION

Hereinafter, preferred embodiments of the present disclosure will be described in detail with reference to drawings. It should be noted that, in the specification and drawings, same reference signs denote substantially same steps and elements, and repeated explanation of these steps and elements will be omitted.

According to an embodiment of the present disclosure, a radio base station may be connected with a plurality of mobile stations. In addition, a first mobile station in the plurality of mobile stations can form at least one mobile station pair with other mobile station in the plurality of mobile stations. According to an example of the present disclosure, mobile stations in each mobile station pair share same time and/or frequency resources.

Figure 1:
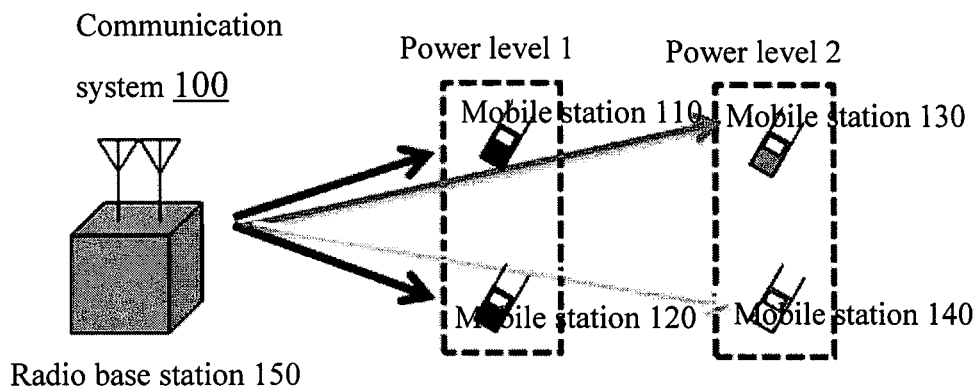
FIG. 1 shows a schematic diagram of a communication system according to an embodiment of the present disclosure.

FIG. 1 shows a schematic diagram of a communication system 100 according to an embodiment of the present disclosure. In an example shown in FIG. 1, the communication system 100 is a system implemented by using a Non-Orthogonal Multiple-Access (NOMA) technology and a Multi-User Multiple-Input Multiple-Output (MU-MIMO) technology. As shown in FIG. 1, the communication system 100 includes mobile stations 110, 120, 130 and 140 and a radio base station 150. The mobile stations 110 and 120 transmit data at a power level 1, and the mobile stations 130 and 140 transmit data at a power level 2. Furthermore, in order to further increase a capacity of the system, the communication system 100 uses a 2×2 MIMO antenna array for transmission. At the power level 1, the radio base station 150 may use two mutually orthogonal beams for the mobile stations 110 and 120 to achieve space-division multiplexing. Similarly, at the power level 2, the radio base station 150 may use two mutually orthogonal beams for the mobile stations 130 and 140 to achieve space-division multiplexing. The mobile station 110 can form a mobile station pair with any one of the mobile stations 120, 130, and 140. In addition, similar to the mobile station 110, the mobile station 120, 130 or 140 can form a mobile station pair with another mobile station in the communication system.

Figure 2:
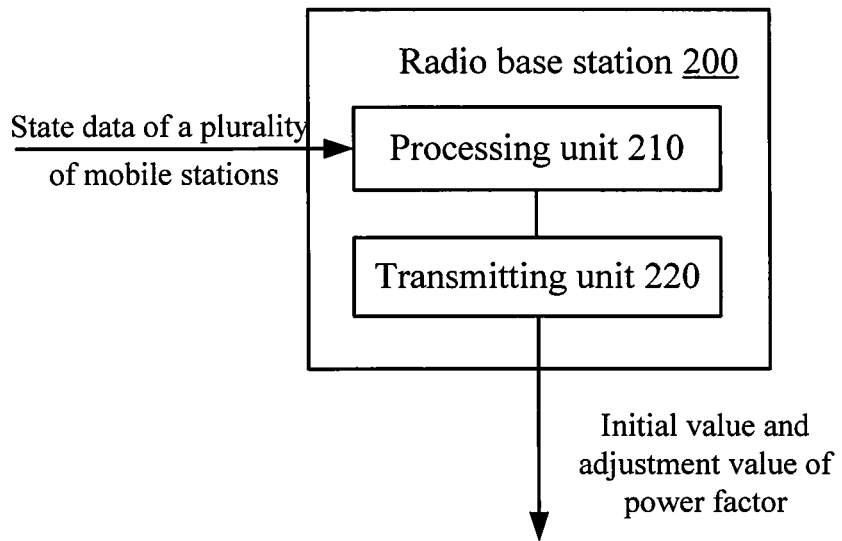
FIG. 2 shows an exemplary structural block diagram of a radio base station according to an embodiment of the present disclosure.

FIG. 2 shows an exemplary structural block diagram of a radio base station 200 according to an embodiment of the present disclosure. As described above, the radio base station 200 is connected with a plurality of mobile stations, wherein a first mobile station in the plurality of mobile stations can form at least one mobile station pair with other mobile station in the plurality of mobile stations. As shown in FIG. 2, the radio base station 200 comprises a processing unit 210 and a transmitting unit 220.

Specifically, the processing unit 210 may determine an initial value of a power factor of each mobile station pair according to state data of respective mobile stations in the mobile station pair. According to one example of the present disclosure, a form of a power factor may be predetermined and stored, wherein the form of the power factor may be used for at least one mobile station pair that can be formed. Further in accordance with another example of the present disclosure, the power factor may include a space power factor and a power-level power factor, wherein the space power factor indicates a distribution ratio of transmitting powers among different space resources, and the power-level power factor indicates a distribution ratio of transmitting powers among different power levels. The space resources may be, for example, spatial beams in an MIMO system.

Hereinafter, an example of a power factor of a mobile station in the communication system 100 is described with reference to formula (1). According to one example of the present disclosure, a power factor $P_m$ of each mobile station pair may be expressed by the formula (1) as follows:

$$P_m = (\bar{\alpha}_{1,1}^{(m)}, \bar{\alpha}_{1,2}^{(m)}, \bar{\alpha}_{2,1}^{(m)}, \bar{\alpha}_{2,2}^{(m)}, \bar{\beta}_1^{(m)}, \bar{\beta}_2^{(m)}) \quad (1)$$

where $\bar{\alpha}_{1,1}^{(m)}$, $\bar{\alpha}_{1,2}^{(m)}$, $\bar{\alpha}_{2,1}^{(m)}$, $\bar{\alpha}_{2,2}^{(m)}$ is a space power factor, indicating a distribution ratio of transmitting powers between two orthogonal beams at a first power level and two orthogonal beams at a second power level for a mobile station pair m; $\bar{\beta}_1^{(m)}$, $\bar{\beta}_2^{(m)}$ is a power-level power factor, indicating a distribution ratio of transmitting powers between the first power level and the second power level for the mobile station pair m. Preferably, $\bar{\alpha}_{1,1}^{(m)}$, $\bar{\alpha}_{1,2}^{(m)}$, $\bar{\alpha}_{2,1}^{(m)}$, $\bar{\alpha}_{2,2}^{(m)}$ may be normalized, to make $\bar{\alpha}_{i,1}^{(m)} + \bar{\alpha}_{i,2}^{(m)} = 1$, where i denotes the power level; in an NOMA system shown in FIG. 1, i=1 or 2, and similarly, $\bar{\beta}_1^{(m)}$, $\bar{\beta}_2^{(m)}$ may be normalized, to make $\bar{\beta}_1^{(m)} + \bar{\beta}_2^{(m)} = 1$.

Furthermore, in accordance with another example of the present disclosure, the state data of the respective mobile stations may be historical state data of the respective mobile stations. For example, the state data received from the respective mobile stations in a predetermined time period may be acquired as the historical state data of the respective mobile stations. For another example, the state data may be communication state data of the mobile station, for example, a current rank indicator indicating a current rank of the mobile station, and a current state indicator corresponding to the current rank and indicating a current state. In one example according to the present disclosure, the current rank indicator indicating the current rank of the mobile station may be a Rank Indication (RI), in addition, the current state indicator corresponding to the current rank and indicating the current state may be a set of Pre-encoder Matrix Indication (PMI) and Channel Quality Indication (CQI) corresponding to the current rank indicated by the RI.

In addition, the processing unit 210 may determine an adjustment value of the power factor for the first mobile station according to state data of the first mobile station. According to one example of the present disclosure, the processing unit 210 may determine a specific mobile station pair where the first mobile station is located currently in at least one mobile station pair, and determine a current value of the power factor for the first mobile station by an iterative process according to an initial value of the specific mobile station pair determined previously and state data of the first mobile station received from the first mobile station. Preferably, the current value of the power factor may be a corresponding power factor when a scheduling metric value of the first mobile station is maximum.

According to one example of the present disclosure, an iterative process for calculating a current value of a power factor may include a two-step calculation in each iteration, i.e., a calculation for calculating an iterative value of a power-level power factor and a calculation for calculating an iterative value of a space power factor. Preferably, in each iteration, an iterative value of a power-level power factor may be calculated according to a given space power factor at first, and then an iterative value of the space power factor may be calculated according to the calculated power-level power factor.

Hereinafter, an iterative process for calculating a current value of a power factor according to an example of the present disclosure is described with reference to formulas (2) to (5). In the example, it is assumed that a power factor $P_n$ of a specific mobile) station pair n may be expressed by $P_n = (\overline{\alpha}_{1,1}^{(n)}, \overline{\alpha}_{1,2}^{(n)}, \overline{\alpha}_{2,1}^{(n)}, \overline{\alpha}_{2,2}^{(n)}, \overline{\beta}_1^{(n)}, \overline{\beta}_2^{(n)})$ as shown in formula (1). In addition, as described above, in the example, in each iteration, an iterative value of a power-level power factor may be calculated according to a given space power factor at first, and then an iterative value of the space power factor may be calculated according to the calculated power-level power factor.

Specifically, as shown in formula (2) below, the processing unit 210 may use an initial value of a space power factor in a specific mobile station pair as an iterative initial value $\{\alpha_{1,1}^{(0)}, \alpha_{1,2}^{(0)}, \alpha_{2,1}^{(0)}, \alpha_{2,2}^{(0)}\}$:

$$\{\alpha_{1,1}^{(0)}, \alpha_{1,2}^{(0)}, \alpha_{2,1}^{(0)}, \alpha_{2,2}^{(0)}\} = \{\overline{\alpha}_{1,1}^{(n)}, \overline{\alpha}_{1,2}^{(n)}, \overline{\alpha}_{2,1}^{(n)}, \overline{\alpha}_{2,2}^{(n)}\} \quad (2)$$

And then, the processing unit 210 may calculate an iterative value of the power-level power factor when a scheduling metric value of the first mobile station is maximum by formula (3) below according to the iterative initial value and state data of the first mobile station:

$$\{\beta_1^{(k)}, \beta_2^{(k)}\} = \underset{\{\beta_1, \beta_2 | \beta_1 + \beta_2 = 1\}}{\operatorname{argmax}} \left\{ \sum_{i=1}^{N} \sum_{j=1}^{M} \frac{R_{i,j}(\alpha_{i,j}^{(k-1)}, \beta_i^{(k)})}{T_{i,j}} \right\} \quad (3)$$

where k denotes a number of times of iterations, $\beta_i$ denotes a power level, $\alpha_{i,j}$ denotes a power factor of the first mobile station at a power level i in a spatial beam j, N denotes a number of power levels, M denotes a number of spatial beams, $R_{i,j}$ denotes an instantaneous throughput of a first mobile station UE at the power level i in the spatial beam j, $T_{i,j}$ denotes an average throughput of the first mobile station UE at the power level i in the spatial beam j, and $$\sum_{i=1}^{N} \sum_{j=1}^{M} \frac{R_{i,j}(\alpha_{i,j}^{(k-1)}, \beta_i^{(k)})}{T_{i,j}}$$

denotes a scheduling metric value of the first mobile station.

And then, the processing unit 210 may calculate an iterative value of the space power factor when the scheduling metric value of the first mobile station is maximum by formula (4) below according to the calculated iterative value of the power-level power factor and the state data of the first mobile station:

$$\{\alpha_{i,1}^{(k)}, \alpha_{i,2}^{(k)} | i = 1, 2\} = \underset{\{\alpha_{i,1}, \alpha_{i,2}\}}{\operatorname{argmax}} C(k) \quad (4)$$

where, $$C(k) = \sum_{i=1}^{N} \sum_{j=1}^{M} \frac{R_{i,j}(\alpha_{i,j}^{(k)}, \beta_i^{(k)})}{T_{i,j}}.$$

In addition, in an iteration after the first iteration, the processing unit 210 may calculate an iterative value of the power-level power factor when a scheduling metric value of the first mobile station is maximum in a current iteration by formula (3) according to the iterative initial value calculated in a previous iteration and the state data of the first mobile station. Furthermore, the processing unit 210 may further calculate an iterative value of the space power factor when the scheduling metric value of the first mobile station in the current iteration is maximum by formula (5) according to the iterative value of the power-level power factor in the current iteration and the state data of the first mobile station.

The processing unit 210 may further determine whether a scheduling metric value corresponding to the calculated iterative value satisfies a condition for ending an iteration, and generate a current value of the power factor according to the calculated iterative value when the scheduling metric value satisfies the condition for ending an iteration. According to one example of the present disclosure, a number of times of iterations may be predetermined, and when the number of times of iterations is achieved, it may be determined that the scheduling metric value satisfies the condition for ending an iteration. Alternatively, according to another example of the present disclosure, a number of times of iterations may be predetermined. When the number of times of iterations is achieved, it may be determined whether a maximum value of the scheduling metric acquired by the iterative process converges. When the maximum value of the scheduling metric converges, it may be determined that the scheduling metric value satisfies the condition for ending an iteration, and a power factor acquired in a last iteration is used as a current power factor.

For example, by using formula (5) below, it can be determined whether the maximum value of the scheduling metric value acquired by the iterative process converges and a current power factor $\{\alpha_{1,1}^{(*)}, \alpha_{1,2}^{(*)}, \alpha_{2,1}^{(*)}, \alpha_{2,2}^{(*)}, \beta_1^{(*)}, \beta_2^{(*)}\}$ may be acquired:

$$\{\alpha_{1,1}^{(*)}, \alpha_{1,2}^{(*)}, \alpha_{2,1}^{(*)}, \alpha_{2,2}^{(*)}, \beta_1^{(*)}, \beta_2^{(*)}\} = \quad (5)$$

$$\underset{\{\alpha_{i,j}^{(k)}\},\{\beta_i^{(k)}\}}{\arg} \quad (C(k) - \max\{C(1), C(2), \ldots, C(k-1)\} < \varepsilon)$$

where, $\varepsilon$ is a predetermined small value.

It should be noted that, in conjunction with the examples described in formulas (2) to (5), in each iteration, an iterative value of a power-level power factor is calculated according to a given space power factor at first, and then an iterative value of the space power factor is calculated according to the calculated iterative value of the power-level power factor, but the disclosure is not limited thereto. For example, in each iteration, an iterative value of a space power factor is calculated according to a given power-level power factor at first, and then an iterative value of the power-level power factor is calculated according to the calculated iterative value of the space power factor.

After acquiring the current value of the power factor, the processing unit 210 may calculate an adjustment value according to the initial value of the power factor of the specific mobile station pair in at least one mobile station pair and the current value of the power factor. According to one example of the present disclosure, the adjustment value may be a difference between the initial value of the power factor and the current value of the power factor. For example, the adjustment value $\Delta_{i,j}$ of the power factor may be calculated by formula (6) below:

$$\Delta_{i,j} = 10\log_{10}\left(\frac{(\alpha_{i,j}^{(*)}\beta_i^{(*)})}{(\alpha_{i,j}^{(m)}\beta_i^{(m)})}\right), \text{dB} \quad (6)$$

The transmitting unit 220 may transmit the initial value of the at least one mobile station pair and the adjustment value of the first mobile station to the first mobile station, so as to make the first mobile station determine a transmitting power allocated to the first mobile station according to the initial value and the adjustment value. According to one example of the present disclosure, the transmitting unit 220 may transmit the initial value to the first mobile station through a first signaling, and transmits the adjustment value to the first mobile station through a second signaling, wherein the first signaling is an upper-level signaling of the second signaling. Preferably, the first signaling may be a signaling from an upper-level device of the radio base station, for example, an RRC signaling, etc. In addition, the second signaling may be a signaling from the radio base station, for example, a PDDCH signaling, etc.

In addition, since a state of the mobile station is relatively stable, the transmitting unit 220 may notify the initial value of the power factor of the mobile station pair to the first mobile station in a semi-static manner. Furthermore, since a channel state of the mobile station changes frequently, the transmitting unit 220 may notify the adjustment value of the power factor for the mobile station to the first mobile station in real-time. In other words, the radio base station 200 needs not to frequently notify the initial value of the power factor of the mobile station pair to the first mobile station, but only needs to notify the adjustment value of the power factor to the first mobile station, and then a transmitting power used by the mobile station may be allocated accurately. And thus, signaling overhead is saved while the transmitting power used by the mobile station is allocated accurately.

In another aspect, a transmitting power of the mobile station may be determined according to the initial value and the adjustment value when the mobile station receives the initial value of the power factor of the mobile station pair and the adjustment value of the power factor for the mobile station from the radio base station.

Figure 3:
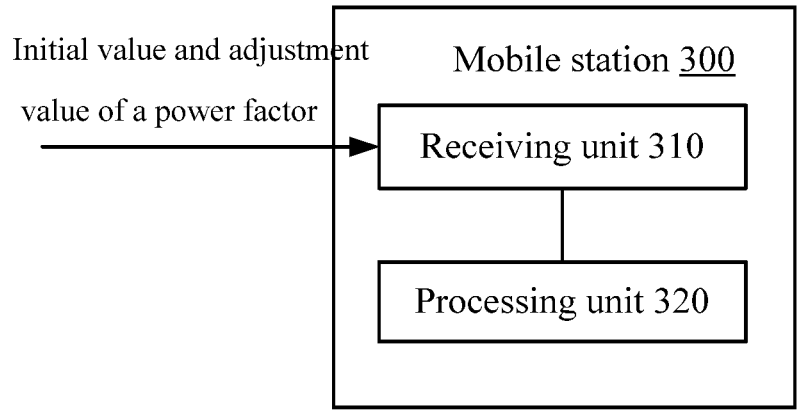
FIG. 3 shows an exemplary structural block diagram of a mobile station according to an embodiment of the present disclosure.

FIG. 3 shows an exemplary structural block diagram of a mobile station 300 according to an embodiment of the present disclosure. As described above, a plurality of mobile stations including the mobile station 300 are connected with a same radio base station, wherein the mobile station 300 can form at least one mobile station pair with other mobile stations in the plurality of mobile stations. As shown in FIG. 3, the mobile station 300 comprises a receiving unit 310 and a processing unit 320.

Specifically, the receiving unit 310 may receive an initial value of a power factor of the at least one mobile station pair and an adjustment value of the power factor for the mobile station. The radio base station may generate the initial value and the adjustment value of the power factor in the manner described in conjunction with FIG. 2, which will be not repeated here. In addition, the receiving unit 310 may receive the initial value of the power factor through a first signaling, and receive the adjustment value of the power factor through a second signaling, wherein the first signaling is an upper-level signaling of the second signaling. Preferably, the first signaling is a signaling from an upper-level device of the radio base station, for example, an RRC signaling, etc. In addition, the second signaling is a signaling from the radio base station, for example, a PDDCH signaling, etc. Furthermore, the receiving unit 310 may receive the initial value of the power factor transmitted in a semi-static manner and the adjustment value of the power factor transmitted in real-time. In this case, according to one example of the present disclosure, the mobile station 300 may further comprise a storage unit. The storage unit may be preset to store initial values of respective factors in the power factors in an SIC order for subsequent calculations. Thus, the mobile station 300 needs not to frequently receive the initial value of the power factor of the mobile station pair from the radio base station, but only needs to receive the adjustment value of the power factor, and then a transmitting power allocated to the mobile station may be determined accurately. And thus, signaling overhead is saved while the transmitting power allocated to the mobile station is determined accurately.

The processing unit 320 may determine an initial value of a power factor of a specific mobile station pair where the mobile station is located currently according to the received initial value. And then, the processing unit 320 may determine a power factor of the mobile station according to the initial value of the power factor of the specific mobile station pair and the adjustment value, and determine a transmitting power allocated to the mobile station according to the power factor.

In the radio base station and the mobile station according to the above embodiments, a form of a power factor is predetermined, an initial value of a power factor in each mobile station pair is determined according to state data of respective mobile stations in the mobile station pair, and an adjustment value of the power factor for the first mobile station is determined according to state data of the first mobile station in the mobile station pair. Therefore, the radio base station may accurately determine a transmitting power to be allocated to the mobile station and used by the mobile station according to the initial value of the power factor in the mobile station pair where the mobile station is located and the adjustment value of the mobile station. Accordingly, the mobile station may accurately determine its transmitting power according to the received initial value and the adjustment value.

Figure 4:
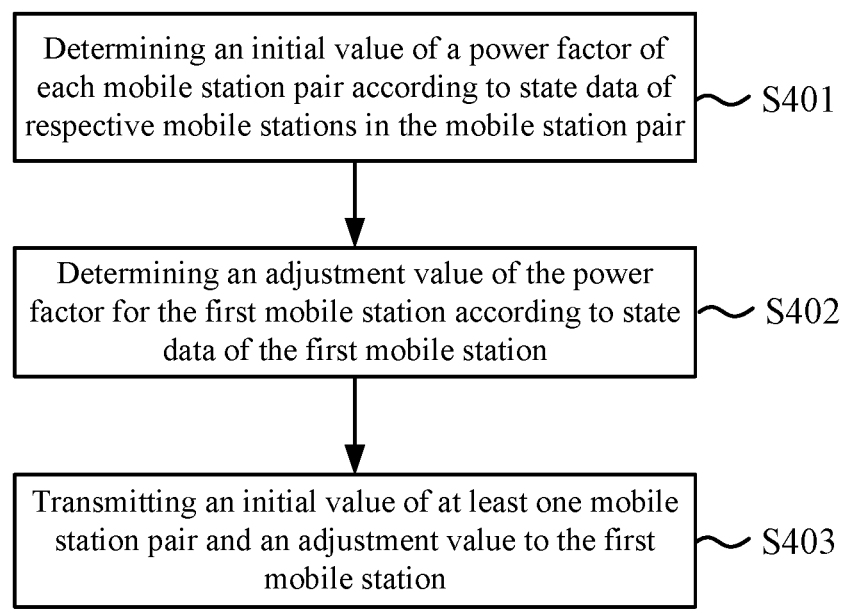
FIG. 4 shows a flow chart of a method for determining a transmitting power according to an embodiment of the present disclosure.

Hereinafter, a method 400 for determining a transmitting power according to an embodiment of the present disclosure is described with reference to FIG. 4. FIG. 4 shows a flow chart of a method 400 for determining a transmitting power according to an embodiment of the present disclosure. Respective steps of the method 400 for determining the transmitting power may be assigned to be implemented by corresponding units in the radio base station 200 shown in FIG. 2. Therefore, only main steps of the method 400 for determining the transmitting power are described as follows, but detailed content described in conjunction with FIG. 2 in the above has been omitted.

As shown in FIG. 4, in step S401, an initial value of a power factor of the mobile station pair is determined according to state data of respective mobile stations in each mobile station pair. According to one example of the present disclosure, a form of a power factor is predetermined and stored, wherein the form of the power factor may be used for at least one mobile station pair that can be formed. Further in accordance with another example of the present disclosure, the power factor may include a space power factor and a power-level power factor, wherein the space power factor indicates a distribution ratio of transmitting powers among different space resources, and the power-level power factor indicates a distribution ratio of transmitting powers among different power levels. The space resources may be, for example, spatial beams in an MIMO system. For example, a power factor of each mobile station pair may be shown in the above formulas.

Further in accordance with another example of the present disclosure, the state data of the respective mobile stations may be historical state data of the respective mobile stations. For example, the state data received from the respective mobile stations in a predetermined time period may be acquired as the historical state data of the respective mobile stations. For another example, the state data may be communication state data of the mobile station, for example, a current rank indicator indicating a current rank of the mobile station, and a current state indicator corresponding to the current rank and indicating a current state. In one example according to the present disclosure, the current rank indicator indicating the current rank of the mobile station may be a Rank Indication (RI), in addition, the current state indicator corresponding to the current rank and indicating the current state may be a set of Pre-encoder Matrix Indication (PMI) and Channel Quality Indication (CQI) corresponding to the current rank indicated by the RI.

In step S402, an adjustment value of the power factor for the first mobile station is determined according to state data of the first mobile station. According to one example of the present disclosure, in step S402, a specific mobile station pair where the first mobile station is located currently may be determined in at least one mobile station pair, and a current value of the power factor for the first mobile station may be determined by an iterative process according to an initial value of the specific mobile station pair determined previously and state data of the first mobile station received from the first mobile station. After the current value of the power factor is acquired, an adjustment value may be calculated according to the initial value of the power factor of the specific mobile station pair in the at least one mobile station pair and the current value of the power factor.

Preferably, the current value of the power factor may be a corresponding power factor when a scheduling metric value of the first mobile station is maximum.

According to one example of the present disclosure, an iterative process for calculating a current value of a power factor may include two-step calculation in each iteration, i.e., a calculation for calculating an iterative value of a power-level power factor and a calculation for calculating an iterative value of a space power factor. Preferably, in each iteration, an iterative value of a power-level power factor may be calculated according to a given space power factor at first, and then an iterative value of the space power factor may be calculated according to the calculated power-level power factor.

Figure 5:
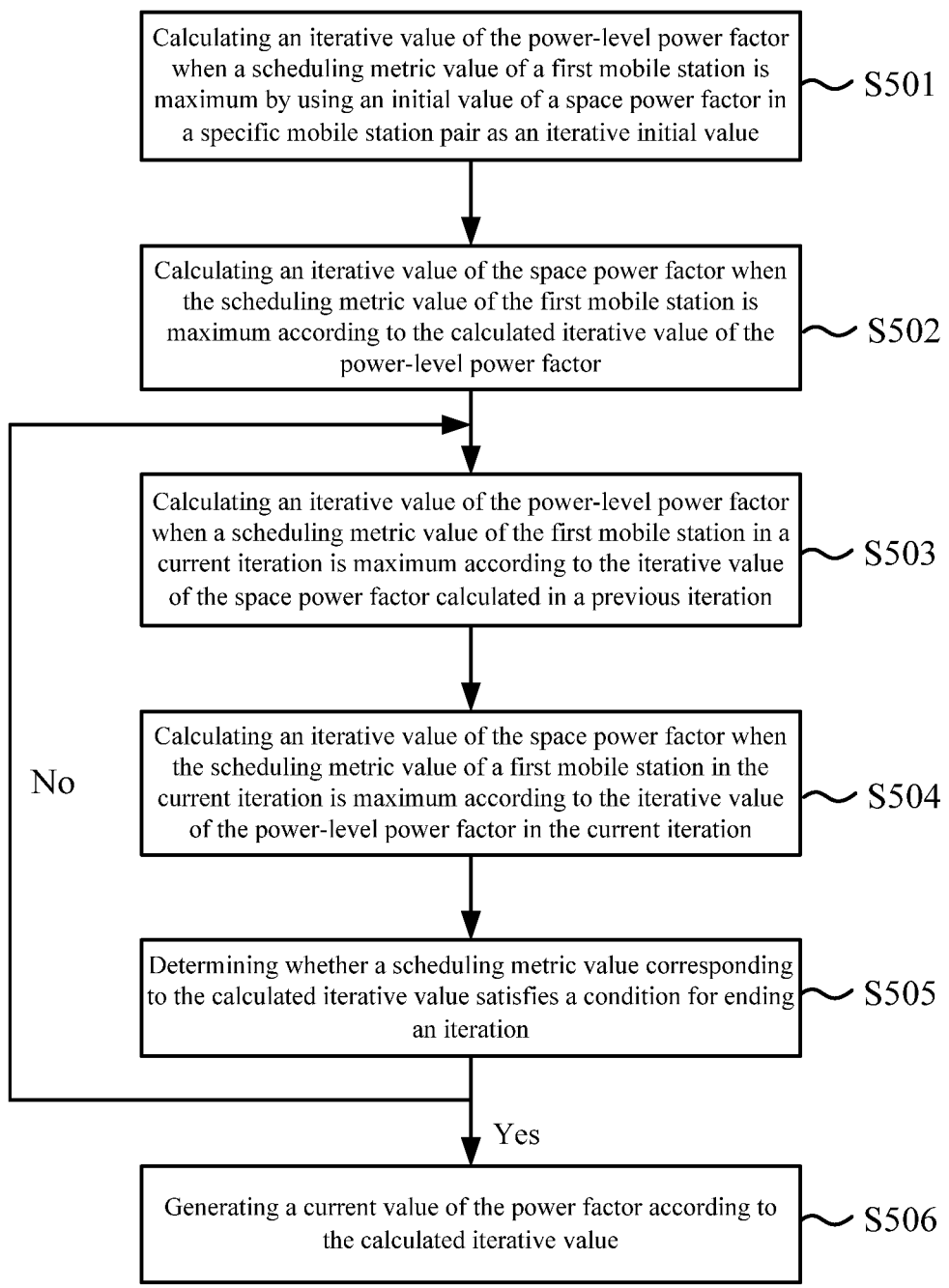
FIG. 5 shows a flow chart of an iterative process and a method for calculating an adjustment value according to results of the iterative process according to an embodiment of the present disclosure.

FIG. 5 shows a flow chart of an iterative process and a method 500 for calculating an adjustment value according to results of the iterative process according to an embodiment of the present disclosure. As shown in FIG. 5, in step S501, an iterative value of the power-level power factor is calculated when a scheduling metric value of a first mobile station is maximum by using an initial value of a space power factor in a specific mobile station pair as an iterative initial value and according to state data of the first mobile station. Then, in step S502, an iterative value of the space power factor is calculated when the scheduling metric value of the first mobile station is maximum according to the iterative value of the power-level power factor calculated in step S501 and the state data of the first mobile station.

After a first iteration is completed, in a second and follow-up iterations, as shown in S503, an iterative value of the power-level power factor when the scheduling metric value of the first mobile station is calculated in a current iteration is maximum according to the iterative value of the space power factor calculated in a previous iteration and the state data of the first mobile station. Then, in step S504, an iterative value of the space power factor when the scheduling metric value of the first mobile station in the current iteration is maximum is calculated according to the iterative value of the power-level power factor in the current iteration and the state data of the first mobile station.

In step S505, it is determined whether a scheduling metric value corresponding to the calculated iterative value satisfies a condition for ending an iteration. According to one example of the present disclosure, a number of times of iterations may be predetermined, and when the number of times of iterations is achieved, it may be determined that the scheduling metric value satisfies the condition for ending an iteration. Alternatively, according to another example of the present disclosure, a number of times of iterations may be predetermined. When the number of times of iterations is achieved, it may be determined whether a maximum value of the scheduling metric acquired by the iterative process converges. When the maximum value of the scheduling metric converges, it may be determined that the scheduling metric value satisfies the condition for ending an iteration, and a power factor acquired in a last iteration is used as a current power factor. In addition, when the scheduling metric value satisfies the condition for ending an iteration, in step S506, a current value of the power factor is generated according to the calculated iterative value. In another aspect, when the scheduling metric value does not satisfy the condition for ending an iteration, steps S503 to S505 may be repeated. In conjunction with the formulas (2) to (6) above, it has been described an iterative process and calculation of an adjustment value of a power factor according to results of the iterative process in an example of the present disclosure, which will be repeated here.

It should be noted that, in the example shown in FIG. 5, in each iteration, an iterative value of a power-level power factor is calculated according to a given space power factor at first, and then an iterative value of the space power factor is calculated according to the calculated iterative value of the power-level power factor, but the disclosure is not limited thereto. Or for example, in each iteration, an iterative value of a space power factor is calculated according to a given power-level power factor at first, and then an iterative value of the power-level power factor is calculated according to the calculated iterative value of the space power factor.

Returning to FIG. 4, in step S403, an initial value of at least one mobile station pair and an adjustment value of the first mobile station are transmitted to the first mobile station, so as to make the first mobile station determine a transmitting power allocated to the first mobile station according to the initial value and the adjustment value. According to one example of the present disclosure, in step S403, the initial value may be transmitted to the first mobile station through a first signaling, and the adjustment value may be transmitted to the first mobile station through a second signaling, wherein the first signaling is an upper-level signaling of the second signaling. Preferably, the first signaling is a signaling from an upper-level device of the radio base station, for example, an RRC signaling, etc. In addition, the second signaling is a signaling from the radio base station, for example, a PDDCH signaling, etc.

In addition, since a state of the mobile station is relatively stable, in step S403, the initial value of the power factor of the mobile station pair may be notified to the first mobile station in a semi-static manner. Furthermore, since a channel state of the mobile station changes frequently, in step S403, the adjustment value of the power factor for the mobile station may be notified to the first mobile station in real-time. In other words, the radio base station needs not to frequently notify the initial value of the power factor of the mobile station pair to the first mobile station, but only needs to notify the adjustment value of the power factor to the first mobile station, and then a transmitting power used by the mobile station may be allocated accurately. And thus, signaling overhead is saved while the transmitting power used by the mobile station is allocated accurately.

In another aspect, a transmitting power of the mobile station may be determined according to the initial value and the adjustment value when the mobile station receives the initial value of the power factor of the mobile station pair and the adjustment value of the power factor for the mobile station from the radio base station.

Figure 6:
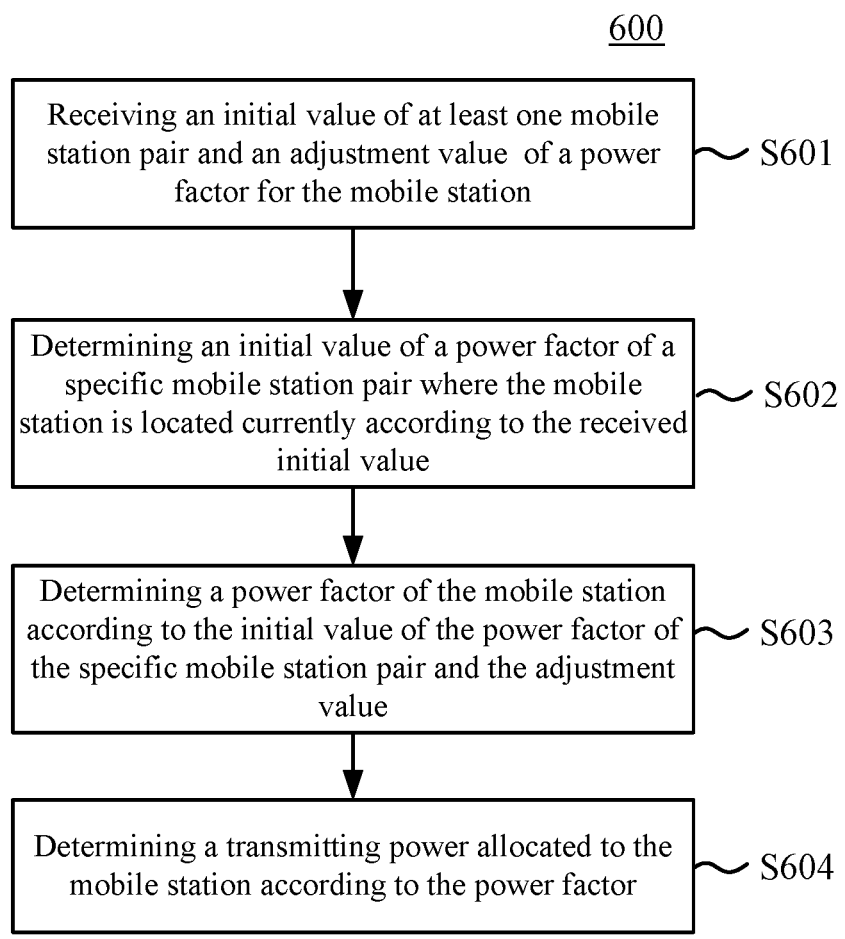
FIG. 6 shows a flow chart of a method for determining a transmitting power according to another embodiment of the present disclosure.

Hereinafter, a method 600 for determining a transmitting power according to another embodiment of the present disclosure is described with reference to FIG. 6. FIG. 6 shows a flow chart of a method 600 for determining a transmitting power according to another embodiment of the present disclosure. Respective steps of the method 600 for determining the transmitting power may be assigned to be implemented by corresponding units in the mobile station 300 shown in FIG. 3. Therefore, only main steps of the method 600 for determining the transmitting power are described as follows, but detailed content described in conjunction with FIG. 3 in the above has been omitted.

As shown in FIG. 6, in step S601, an initial value of a power factor of at least one mobile station pair and an adjustment value of the power factor for a mobile station are received from a radio base station. The radio base station may generate the initial value and the adjustment value of the power factor in the manner described in conjunction with FIG. 2, which will be not repeated here. In addition, in step S601, the initial value of the power factor may be received through a first signaling, and the adjustment value of the power factor may be received through a second signaling, wherein the first signaling is an upper-level signaling of the second signaling. Preferably, the first signaling is a signaling from an upper-level device of the radio base station, for example, an RRC signaling, etc. In addition, the second signaling is a signaling from the radio base station, for example, a PDDCH signaling, etc. Furthermore, in step S601, the initial value of the power factor transmitted in a semi-static manner and the adjustment value of the power factor transmitted in real-time may be received. In this case, according to one example of the present disclosure, the method 600 may further comprise storing initial values of respective factors in the power factor in an SIC order for subsequent calculations. Thus, the mobile station needs not to frequently receive the initial value of the power factor of the mobile station pair from the radio base station, but only needs to receive the adjustment value of the power factor, and then a transmitting power allocated to the mobile station may be determined accurately. And thus, signaling overhead is saved while the transmitting power allocated to the mobile station is determined accurately.

Then, in step S602, an initial value of a power factor of a specific mobile station pair where the mobile station is located currently is determined according to the received initial value. In step S603, a power factor of the mobile station is determined according to the initial value of the power factor of the specific mobile station pair and the adjustment value. Finally, in step S604, a transmitting power allocated to the mobile station is determined according to the power factor.

In the method for determining a transmitting power according to the above embodiments, a form of a power factor is predetermined, an initial value of a power factor in each mobile station pair is determined according to state data of respective mobile stations in the mobile station pair, and an adjustment value of a power factor for the first mobile station is determined according to state data of the first mobile station in the mobile station pair. And thus, the radio base station may accurately determine a transmitting power to be allocated to the mobile station and used by the mobile station according to the initial value of the power factor in the mobile station pair where the mobile station is located and the adjustment value of the mobile station. Accordingly, the mobile station may accurately determine its transmitting power according to the received initial value and the adjustment value.

Those ordinarily skilled in the art may be aware of that, the units, modules and algorithm steps according to respective examples described in conjunction with the embodiments in the present disclosure, may be implemented by electronic hardware, computer software, or a combination thereof. And the computer software may be stored in a computer storage medium of any form. In order to clearly describe interchangeability between hardware and software, composition and steps of the respective examples have been generally described according to functions in the above descriptions. As for whether such functions are executed by hardware or software, it depends on specific application of a technical solution and design constraints. One person skilled in the art can use different methods for respective particular applications to achieve the described functions, but such implementation shall not be regarded as exceeding the scope of the present disclosure.

One person skilled in the art should appreciate that various modifications, combinations, partial combinations and replacements can be made to the present disclosure according to design requirements and other factors, as long as they are within the scope of the appended claims and equivalents thereof.

The invention claimed is:

1. A radio base station, connected with a plurality of mobile stations, wherein a first mobile station in the plurality of mobile stations forms at least one mobile station pair with other mobile station in the plurality of mobile stations, the radio base station comprising:
a processor;
a storage medium having computer program instructions stored thereon, wherein the computer program instructions, when executed by the processor, perform processing of:
determining an initial value of a power factor of each mobile station pair according to state data of respective mobile stations in the mobile station pair, and determine an adjustment value of the power factor for the first mobile station according to state data of the first mobile station; and
transmitting the initial value of the at least one mobile station pair and the adjustment value to the first mobile station, so as to make the first mobile station determine a transmitting power allocated to the first mobile station according to the initial value and the adjustment value, wherein
the respective mobile stations in the mobile station pair use different space resources and/or power levels for transmission,
the power factor includes a space power factor and a power-level power factor,
the space power factor indicates a distribution ratio of transmitting powers among different space resources,
the power-level power factor indicates a distribution ratio of transmitting powers among different power levels.

2. The radio base station according to claim 1, wherein
the processor determines a current value of the power factor for the first mobile station by an iterative process according to an initial value of a specific mobile station pair in the at least one mobile station pair and state data of the first mobile station; and calculates the adjustment value according to the initial value of the power factor of the specific mobile station pair and the current value of the power factor.

3. The radio base station according to claim 2, wherein
in the iterative process, the processor calculates an iterative value of the power-level power factor when a scheduling metric value of the first mobile station is maximum by using an initial value of a space power factor in the specific mobile station pair as an iterative initial value and according to state data of the first mobile station, and calculates an iterative value of the space power factor when the scheduling metric value of the first mobile station is maximum according to the calculated iterative value of the power-level power factor and the state data of the first mobile station;
in the iterative process, the processor further calculates an iterative value of the power-level power factor when a scheduling metric value of the first mobile station in a current iteration is maximum according to the iterative value of the space power factor calculated in a previous iteration and the state data of the first mobile station, and calculates an iterative value of the space power factor when the scheduling metric value of the first mobile station in the current iteration is maximum according to the iterative value of the power-level power factor in the current iteration and the state data of the first mobile station;
the processor determines whether a scheduling metric value corresponding to the calculated iterative value satisfies a condition for ending an iteration, and generates a current value of the power factor according to the calculated iterative value when the scheduling metric value satisfies the condition for ending an iteration.

4. The radio base station according to claim 1, wherein
the processor transmits the initial value to the first mobile station through a first signaling, and transmits the adjustment value to the first mobile station through a second signaling, and
the first signaling is an upper-level signaling of the second signaling.

5. The radio base station according to claim 4, wherein
the first signaling is a signaling from a core network device of the radio base station, and
the second signaling is a signaling from the radio base station.

6. A mobile station, wherein a plurality of mobile stations including the mobile station are connected with a radio base station, and the mobile station can form at least one mobile station pair with other mobile station in the plurality of mobile stations, the mobile station comprising:
a processor;
a storage medium having computer program instructions stored thereon, wherein the computer program instructions, when executed by the processor, perform processing of:
receiving an initial value of a power factor of the at least one mobile station pair and an adjustment value of the power factor for the mobile station;
determining an initial value of a power factor of a specific mobile station pair where the mobile station is located currently according to the received initial value, determine a power factor of the mobile station according to the initial value of the power factor of the specific mobile station pair and the adjustment value, and determine a transmitting power allocated to the mobile station according to the power factor, wherein
the respective mobile stations in the mobile station pair use different space resources and/or power levels for transmission,
the power factor includes a space power factor and a power-level power factor,
the space power factor indicates a distribution ratio of transmitting powers among different space resources,
the power-level power factor indicates a distribution ratio of transmitting powers among different power levels.

7. A method for determining a transmitting power, applied to a radio base station, wherein the radio base station is connected with a plurality of mobile stations, and a first mobile station in the plurality of mobile stations can form at least one mobile station pair with other mobile station in the plurality of mobile stations, the method comprising:
determining an initial value of a power factor of each mobile station pair according to state data of respective mobile stations in the mobile station pair;
determining an adjustment value of the power factor for the first mobile station according to state data of the first mobile station; and
transmitting the initial value of the at least one mobile station pair and the adjustment value to the first mobile station, so as to make the first mobile station determine a transmitting power allocated to the first mobile station according to the initial value and the adjustment value, wherein
the respective mobile stations in the mobile station pair use different space resources and/or power levels for transmission, the power factor includes a space power factor and a power-level power factor, the space power factor indicates a distribution ratio of transmitting powers among different space resources, the power-level power factor indicates a distribution ratio of transmitting powers among different power levels.

8. The method according to claim 7, wherein the determining an adjustment value of the power factor for the first mobile station according to state data of the first mobile station includes:

determining a current value of the power factor for the first mobile station by an iterative process according to an initial value of a specific mobile station pair in the at least one mobile station pair and state data of the first mobile station; and calculating the adjustment value according to the initial value of the power factor of the specific mobile station pair and the current value of the power factor.

9. The method according to claim 8, wherein in the iterative process, calculating an iterative value of the power-level power factor when a scheduling metric value of the first mobile station is maximum by using an initial value of a space power factor in the specific mobile station pair as an iterative initial value and according to state data of the first mobile station;

calculating an iterative value of the space power factor when the scheduling metric value of the first mobile station is maximum according to the calculated iterative value of the power-level power factor and the state data of the first mobile station;

calculating an iterative value of the power-level power factor when a scheduling metric value of the first mobile station in a current iteration is maximum according to the iterative value of the space power factor calculated in a previous iteration and the state data of the first mobile station;

calculating an iterative value of the space power factor when the scheduling metric value of the first mobile station in the current iteration is maximum according to the iterative value of the power-level power factor in the current iteration and the state data of the first mobile station;

determining whether a scheduling metric value corresponding to the calculated iterative value satisfies a condition for ending an iteration; and generating a current value of the power factor according to the calculated iterative value when the scheduling metric value satisfies the condition for ending an iteration.

10. The method according to claim 7, wherein the transmitting an initial value of the at least one mobile station pair and the adjustment value to the first mobile station includes:

transmitting the initial value to the first mobile station through a first signaling, and transmitting the adjustment value to the first mobile station through a second signaling, and the first signaling is an upper-level signaling of the second signaling.

11. The method according to claim 10, wherein the first signaling is a signaling from a core network device of the radio base station, and the second signaling is a signaling from the radio base station.

* * * * *